Aug. 22, 1944.    L. O'BRYAN    2,356,608
GALVANOMETER
Filed July 15, 1943
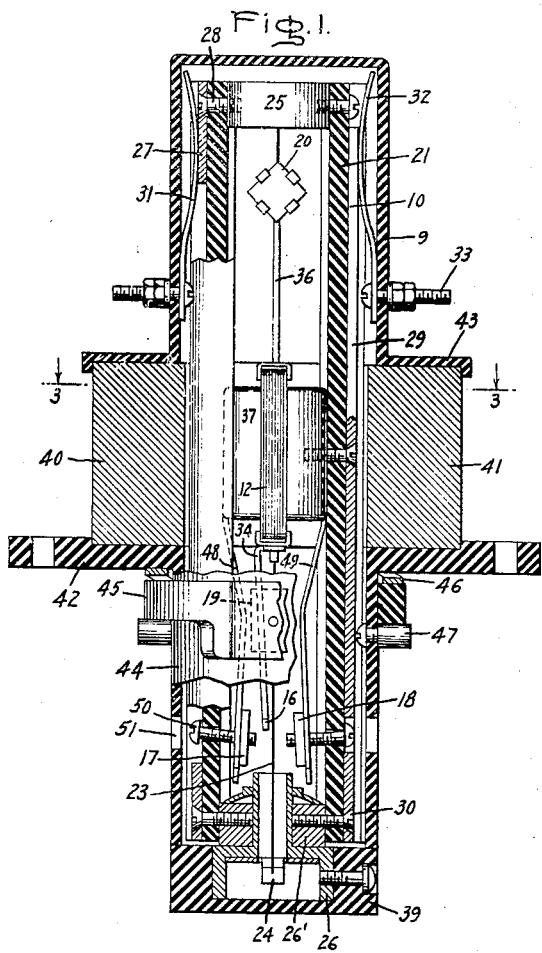
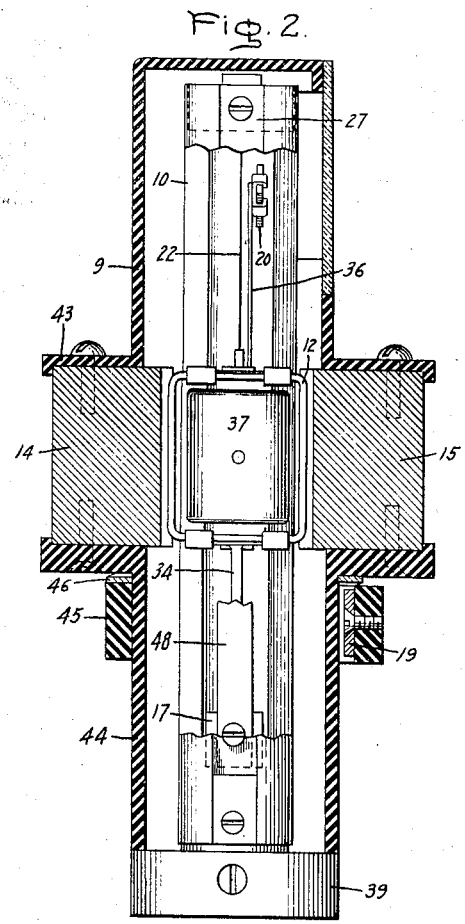
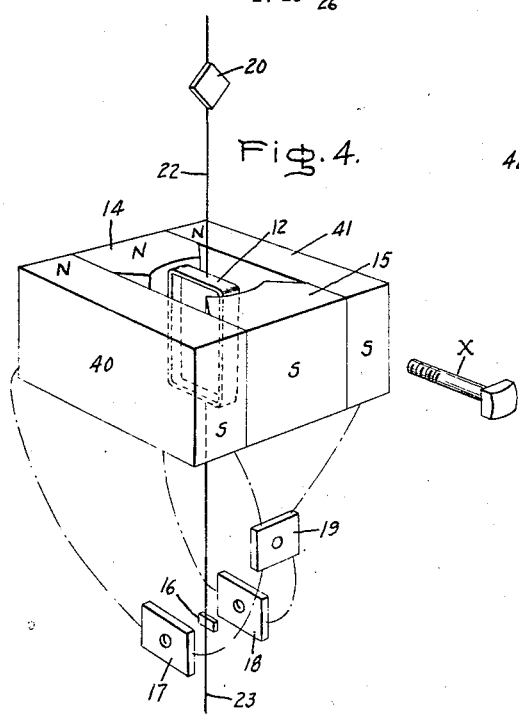
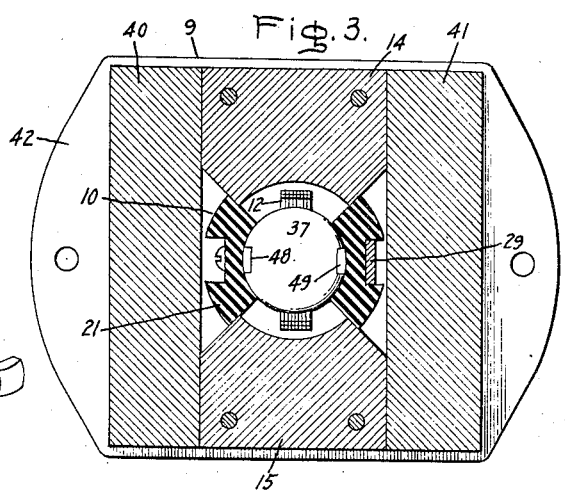
Inventor:
Lorin O'Bryan,
by Harry E. Dunham
His Attorney.

Patented Aug. 22, 1944

2,356,608

UNITED STATES PATENT OFFICE 2,356,608

GALVANOMETER

Lorin O'Bryan, Scotia, N. Y., assignor to General Electric Company, a corporation of New York Application July 15, 1943, Serial No. 494,775

3 Claims. (Cl. 171—95)

My invention relates to galvanometers and in particular to improvements in the form of galvanometer described in United States Patent No. 2,326,252, August 10, 1943, of Theodore A. Rich and assigned to the same assignee as the present invention. In the Rich patent there is described a flux meter with a suspension type moving coil and a stationary permanent magnet field with auxiliary permanent magnet means to compensate for the torque of the suspension and minimize drift. The primary object of my invention is to simplify the construction and improve the action of the auxiliary compensating means and also to provide for an adjustment for the same by means of which the drift tendency in opposite directions can be equalized when upset due to the presence, in the vicinity of the instrument, of disturbing magnetic influences.

The features of my invention which are believed to be novel and patentable will be pointed out in the claims appended hereto. For a better understanding of my invention, reference is made in the following description to the accompanying drawing in which Fig. 1 represents a partially sectioned front view of a suspension galvanometer embodying my invention; Fig. 2 a partially sectioned side view of the same galvanometer; Fig. 3 a top sectional view taken on line 3—3, Fig. 1; and Fig. 4 is a perspective view of certain parts of the galvanometer illustrating the flux paths involved in the operation and adjustment of my invention.

The main magnetic elements of the galvanometer concerned with my invention may be seen in Fig. 4 and comprise a current conducting coil 12 which, when the instrument is used as a flux meter, may be connected in series with a search coil located in the flux field to be measured. Permanent magnet field producing means are provided for cooperating with the current conducting coil 12 having pole pieces 14 and 15. Sixteen (16) represents a tiny permanent magnet secured to the moving system for compensating for the torque of the torsional suspension comprising wires 22 and 23. Spaced from and in flux shunting relation with respect to the compensating magnet 16, are soft iron shunting elements 17 and 18, which elements are adjustable towards and away from magnet 16. These compensating parts are located in the path of leakage flux from the main permanent magnet field of the instrument as represented by dotted lines. Also located in such leakage flux field is a soft iron element 19 which is adjustable about the axis of the suspension so as to adjust the division of the leakage flux between parts 17 and 18. The suspension carries a mirror 20 for deflection indicating purposes.

As will be described in connection with Figs. 1, 2, and 3, the galvanometer comprises an outer magnet unit and supporting closure 9 and an inner removable unit 10 which carries the suspension. The galvanometer is of rugged construction but has high sensitivity. The inner unit is removed from the outer unit by withdrawing the inner unit downward from the bottom.

The removable unit 10 consists of the moving system, a magnetic core 37, and their support (see Figs. 1, 2, and 3). The coil 12, in the form of galvanometer illustrated, is suspended within the removable unit 10 or supporting member by means of a marine type of torsion suspension consisting of wires 22 and 23, each secured at one end to the coil 12 and connected electrically and mechanically at the other end to a resilient mounting such as a leaf spring 24. The main supporting structure consists of a pair of longitudinal strips 21 having the shape of segments of a hollow cylinder and composed of insulating material such as phenolic condensation product. The removable unit 10 includes also circular cup-like members 25 and 26, at least one of which, for example, the latter, is rotatably mounted within the removable unit 10. The springs 24 are secured and electrically connected to the members 25 and 26. In the arrangement illustrated the strips 21 are secured to the member 25 at the upper ends and are secured at the lower ends to a ring 26', within which the member 26 is supported with freedom to be rotated. Any suitable suspension may be employed. I have obtained satisfactory results by the employment of a rectangular cross-section 14-karat gold wire, which is rolled from a wire one and one-half mils in diameter, has a breaking strength of 120 grams, and provides a torsion of 1.2 dyne-centimeters per centimeter. Since the movable armature or coil 12 weighs only 1.2 grams, the apparatus has a high factor of safety with great ability to withstand shock. The gold suspension wires 22 and 23 are electrically connected to the coil 12 to serve also as lead-in wires. In order that an electrical circuit to the rotatable coil may be completed, a contact strip 27, composed of a suitable metal such as copper or brass, is secured to one side of the upper end of one longitudinal strip 21 and is electrically connected with the member 25 by means of a screw 28; and a lengthwise running contact strip 29 is provided, which is electrically connected at the lower end of the other strip 21 by means of a screw 30 to the member 26. The strips 21 are recessed as shown in Fig. 3 to receive the contact strips 27 and 29. Contact springs 31 and 32, electrically connected to terminal studs 33, are provided in the outer galvanometer unit 9 and are so arranged that the contact strips 27 and 29 will make contact with the springs 31 and 32 when the removable member 10 is mounted in place as shown in the drawing.

Secured to the lower end of the current conducting coil 12 is a light rod of suitable composition, such as aluminum tubing 34, and the torque compensating magnet 16 is carried at the lower end of the rod 34 in order to remove the magnet 16 from the immediate influence of the principal magnetic field of the galvanometer. In the case of a galvanometer with the previously described one and one-half mil suspension, the high coercive force permanent magnet 16 need be only .075 in. by .006 in. by .020 in. A suitable composition for the magnet 16 is 24 per cent cobalt, 8 per cent aluminum, about 3 per cent copper, 13 per cent nickel, and the balance iron, magnetized hot and aged after hot magnetization for about four hours at a somewhat lower temperature without magnetic field. However, other high coercive force materials may be employed. Secured to the current conducting coil 12 is also a suitable deflection indicating device, in this case shown as the light reflecting mirror 20 carried at the upper end of a light brass strip 36, which is secured to the upper end of the current conducting coil 12. To increase the sensitivity of the galvanometer by minimizing the magnetic reluctance of the magnetic circuit, a soft iron core 37 is secured to the longitudinal strips 21 within the coil 12. Stops for preventing excessive deflection of the coil 12 may also be provided if desired. If desired, a cap 39, serving as a zero adjusting knob, may also be secured to the lower cuplike member 26.

For providing a unidirectional magnetic field cooperating with the deflecting current conducting coil 12, permanent magnet means are provided consisting of a pair of bar magnets 40 and 41 making magnetic contact with the pole pieces 14 and 15. Together, with suitable supporting and enclosing members, the bar magnets and pole pieces form the outer galvanometer unit 9, which serves as an external housing and support for the galvanometer. The outer unit 9 includes a flanged supporting member 42, an upper enclosing shell 43, and a lower enclosing shell 44. The shells are composed of a suitable insulating material such as synthetic plastic. The upper shell 43 carries the terminals 33 and the contact strips 31 and 32 which are made stiff enough to hold the removable unit 10 within the outer unit by frictional engagement. The flanged member 42 is adapted to be bolted to supporting brackets (not shown). It may be composed of nonmagnetic material and fastens together the magnets 40 and 41 and the pole pieces 14 and 15, and may be made integral with the lower sleeve 44. Preferably the parts 43 and 42 have recessed surfaces into which the magnets and pole pieces fit, and the parts are held together by machine screws in the pole pieces as shown in Fig. 2. The magnetic flux shifter 19 is carried in an internal recess in a collar 45 of insulating material which has a bearing fit about the shell part 44. A deformed washer-shaped spring 46 is inserted between the collar 45 and the underside of flange 42, and the collar is urged upward against mild spring tension by pins 47 beneath the collar and preferably in recessed lower surface parts of such collar, so that the collar may be turned on sleeve 44 through an angle of about 90 degrees. Thus the flux shifter 19 lies in the general leakage flux path between pole piece 15 and the flux shunting parts 17 and 18, as represented in Fig. 1, and may be shifted by rotating collar 45 so as to divide this leakage flux between shunting parts 17 and 18 in any desired relation.

The magnetic shunts 17 and 18 are carried on non-magnetic flexible arms 48 and 49, the upper ends of which are held by being inserted in grooves in opposite sides of the core part 37 and clamped therein by the strips 21 (see Fig. 3). The shunting pieces 17 and 18 may be adjusted towards and away from the tiny permanent magnet 16 by screws 50 which extend through and are carried by the strips 21. This assembly is completely carried by the inner removable member 10, but the screw heads are accessible through openings 51 in the outer housing shell 44, so that the positions of the shunts 17 and 18 are adjustable when the galvanometer is completely assembled as well as before assembly of the inner and outer parts 9 and 10. To prevent accidental adjustment of parts 17 and 18 against the suspension 23 the lower ends of springs 48 and 49 act as stops against the upper end of sleeve 26. The tiny permanent magnet 16 is positioned close to but not touching the suspension 23 between the shunt pieces 17 and 18 by a light aluminum tube 34 extending downward from the lower end of coil 12. When the coil is in midposition illustrated, the permanent magnet 16 lies parallel to the shunt pieces 17 and 18 and is polarized, so that its flux opposes the leakage flux from the main magnet. Thus magnet 16 is polarized in the same direction as magnets 40 and 41, and hence, when turned either way from the dead center position shown, tries to reverse its position end for end and thus produces torques opposite to and proportional to the torsional torques of the suspension when the coil 12 is deflected from zero or central position within the range of the deflection which is not over 45 degrees either way from center position. The shunting pieces 17 and 18 divert or shunt a portion of the leakage flux from the permanent magnet 16 and since these shunts are adjustable towards and away from the permanent magnet 16, the counter-torque produced by the latter may be nicely adjusted to be equal to the suspension torque in both directions from neutral position with the result that the drift of the suspended coil is negligible. Following a flux measurement and corresponding deflection of mirror 20, the deflection is retained for a sufficient length of time as to enable readings to be taken leisurely and accurately.

When the galvanometer is mounted in place and the shunts 17 and 18 properly adjusted so that there is minimum drift, it may so happen that due to the presence of other magnetic material or stray fields in the vicinity, the delicate magnetic adjustment for drift is disturbed. This might be caused, for instance, by the presence of some magnetic material, such as a nail or bolt X, Fig. 1, shown lying generally to the lower right of the galvanometer which would divert some of the leakage flux and weaken the leakage flux field to the right of compensating magnet 16 and partially nullify the presence of shunt 18. Now in order to neutralize the effect of bolt X and other disturbing magnetic influences of like nature, the position of flux shifter 19 may be altered. In this case, 19 would be shifted to the right more in line with shunt piece 18, thereby shifting some stray flux from shunt 17 to shunt 18 and producing a uniform stray field in the vicinity of magnet 16. The final adjustment may require a readjustment of shunt pieces 17 and 18 also. I have found that by means of the adjustments described the countertorque of the suspension may be compensated for and the compensation made equal for either direction of deflection of the suspension from neutral, notwithstanding the presence or absence of other mild disturbing magnetic influences likely to be encountered in practice.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A galvanometer comprising stationary permanent magnet means for producing a flux across an armature gap, a coil rotatively suspended in such gap, a torsional suspension for suspending such coil, and means for nullifying the torque of such suspension when the coil is rotated in either direction from a neutral position where the suspension has no torque comprising a miniature permanent magnet connected to said coil adjacent such suspension but displaced from the immediate vicinity of and lying in the leakage field of the stationary permanent magnet means and polarized in a direction to oppose such leakage field when the coil is in a neutral position, a pair of magnetic members lying parallel to and on opposite sides of said miniature permanent magnet in leakage flux shunting relation thereto and adjustable toward and away therefrom for adjusting the influence of the leakage field on said miniature magnet, and another magnetic member lying in said leakage field between the stationary magnet means and miniature permanent magnet and adjustable so as to modify the relative distribution of leakage field flux between said pair of magnetic members.

2. A galvanometer comprising stationary permanent magnet means for producing a field through an armature gap, an armature coil rotatively suspended in said gap, a torsional suspension for said coil, and means for substantially nullifying the torque of such suspension when the coil is turned in either direction from a neutral position where the suspension torque is zero, comprising a miniature permanent magnet fastened to said coil and positioned closely adjacent said suspension within the leakage field of the stationary permanent magnet means and polarized in a direction to oppose such leakage field when the coil is in a neutral position and means for adjusting the influence of said miniature permanent magnet comprising a pair of magnetic members positioned on opposite sides of the polarized axis of said miniature permanent magnet in leakage flux shunting relation thereto so as to diminish the leakage flux in the immediate vicinity of said miniature permanent magnet and strengthen it on either side of said miniature permanent magnet, and means for individually adjusting each of said pair of magnetic members toward and away from said permanent magnet.

3. A galvanometer of the suspension type comprising an outer housing part and an inner part which fits within the housing part in removable telescoping relation, said outer part including stationary permanent magnet means for producing a field through the inner part, said inner part including a coil and a suspension therefor for torsionally suspending said coil within said field, means for adjusting said suspension for determining the rotary neutral position of said coil in said field when there is zero suspension torque, means carried by said inner part for substantially nullifying the torque of said suspension within the deflecting range of the coil in either direction from neutral position comprising a miniature permanent magnet fastened to said coil closely adjacent the suspension in the leakage field of said stationary permanent magnet means and polarized to oppose such leakage field when the coil is in a neutral position, a pair of magnetic means carried by said inner part on either side of said miniature permanent magnet for shunting leakage flux from the immediate vicinity of the miniature permanent magnet, said means being individually adjustable toward and away from the miniature permanent magnet, and magnetic means supported on the outer housing part in series relation in the leakage flux field with said pair of magnetic members, said part being adjustable about the axis of suspension of said coil for varying the relative distribution of the leakage flux between said pair of magnetic members, all of said adjustments being accessible for adjustment purposes with the inner and outer parts in telescoping assembled relation.

LORIN O'BRYAN.